United States Patent
Shamilian

(10) Patent No.: US 8,332,663 B2
(45) Date of Patent: Dec. 11, 2012

(54) APPARATUS AND METHOD FOR PROVIDING POWER TO A NETWORK INTERFACE DEVICE

(75) Inventor: John Shamilian, Tinton Falls, NJ (US)

(73) Assignee: Alcatel Lucent, Paris (FR)

( * ) Notice: Subject to any disclaimer, the term of this patent is extended or adjusted under 35 U.S.C. 154(b) by 840 days.

(21) Appl. No.: 11/960,915

(22) Filed: Dec. 20, 2007

(65) Prior Publication Data
US 2009/0160662 A1   Jun. 25, 2009

(51) Int. Cl.
- G06F 1/26 (2006.01)
- G06F 1/30 (2006.01)
- G06F 1/32 (2006.01)

(52) U.S. Cl. ......... 713/300; 713/310; 713/320; 370/401

(58) Field of Classification Search ............ 713/300, 713/310, 320–324, 330, 340; 370/200, 401; 398/120
See application file for complete search history.

(56) References Cited

U.S. PATENT DOCUMENTS

| | | | |
|---|---|---|---|
| 7,761,719 B2 * | 7/2010 | Ghoshal et al. | 713/300 |
| 2006/0143583 A1 * | 6/2006 | Diab et al. | 716/4 |
| 2006/0274764 A1 * | 12/2006 | Mah et al. | 370/401 |
| 2007/0127713 A1 * | 6/2007 | Schley-May et al. | 379/413.02 |
| 2008/0159744 A1 * | 7/2008 | Soto et al. | 398/115 |
| 2008/0294918 A1 * | 11/2008 | Dhuyvetter et al. | 713/310 |

* cited by examiner

*Primary Examiner* — Fahmida Rahman
(74) *Attorney, Agent, or Firm* — Wall & Tong, LLP

(57) ABSTRACT

An apparatus and a method for providing power to a network interface device are disclosed. The apparatus includes a gateway device and a battery back-up and power unit. The battery back-up and power unit provides power to the gateway device, which in turn provides powers to the network interface device.

13 Claims, 1 Drawing Sheet

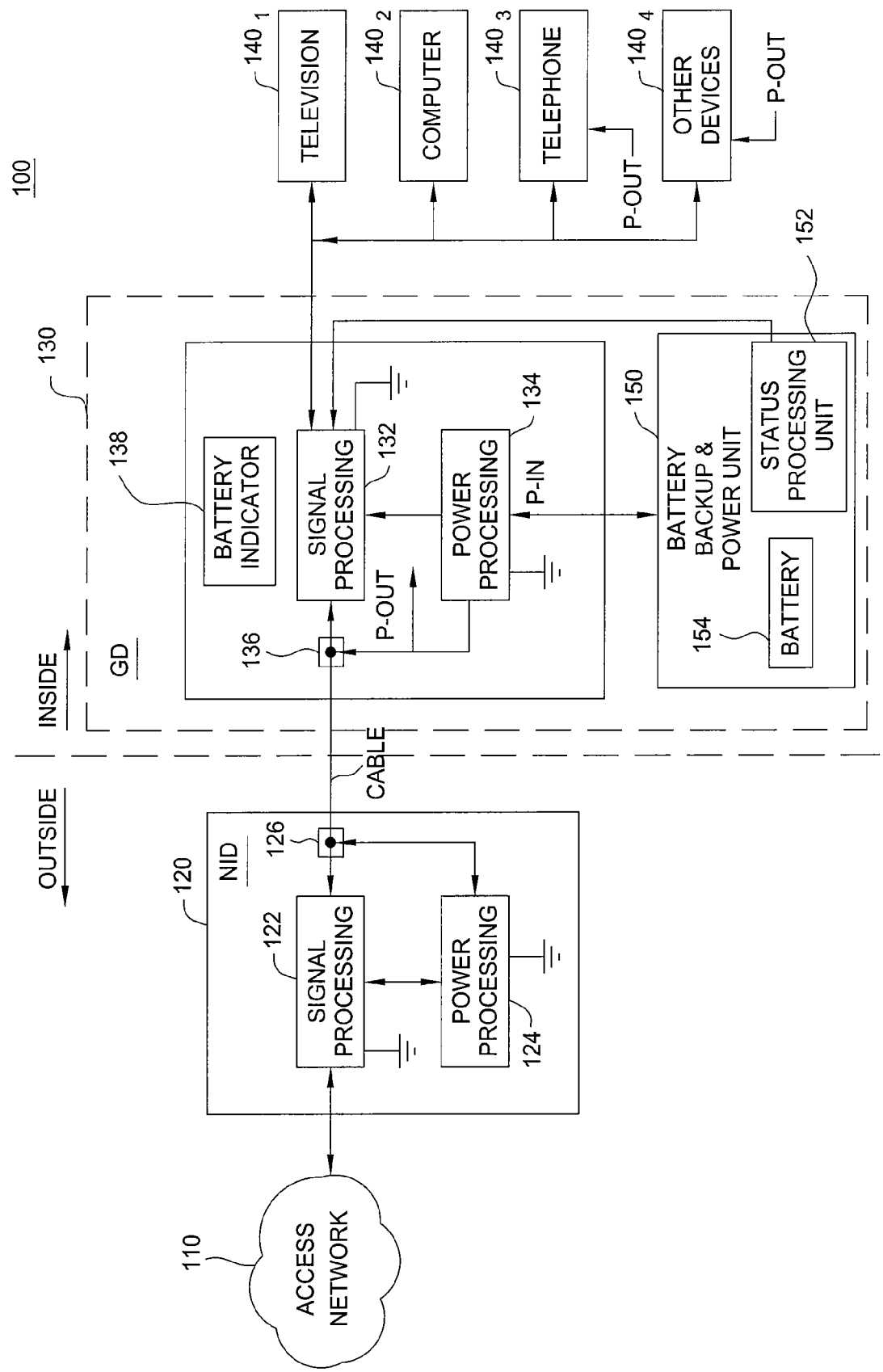

APPARATUS AND METHOD FOR PROVIDING POWER TO A NETWORK INTERFACE DEVICE

FIELD OF THE INVENTION

The invention relates to the field of telecommunications and, more specifically, to providing power for an external network interface device.

BACKGROUND

Fiber Optic Service ("FiOS") is an internet/TV/phone service that employs optical fibers running from a distribution company's facilities into individual homes and offices. Other broadband network topologies are also used to convey such services. Typically, a network interface device ("NID") is installed at a service-accessible location external to a home or office to terminate a broadband access network. The NID provides an interface between the access network and the home or office network devices.

The NID receives power from the customer's premises, which requires running cabling/wires from the NID to a power source. To provide power for the NID during power failures, a back-up battery, in addition to signal bearing cabling/wires, is typically placed somewhere inside the customer's premises (internal to the home or the office) and plugged into a regular electrical power outlet. Thus, additional cablings/wires from the NID to the battery back-up unit are needed.

SUMMARY

Various deficiencies in the prior art are addressed through various embodiments of an apparatus and a method for providing power to a network interface device. In one embodiment, an apparatus for providing power to a network interface device includes a gateway device and a battery back-up and power unit located internal to a customer's premises (inside). The network interface device is located external to the customer's premises (outside). The battery back-up and power unit powers the gateway device, which in turn powers the network interface device. The gateway device may include a power injection unit which injects power signals into a signal path of a data communication cable between the gateway device and the network interface device. The injected power signals are subsequently extracted by a power extraction unit and provided to the network interface device.

Another embodiment includes a method for providing power to a network interface device. According to this embodiment, a power signal is received from a power unit by a gateway device. The gateway device processes the received signal and injects the processed signal via a power injection unit into a signal path of a data communication cable between the gateway device and the network interface device. A power extraction unit of the network interface device extracts the injected power signal from the data communication cable.

BRIEF DESCRIPTION OF THE DRAWINGS

The teachings of various embodiments can be readily understood by considering the following detailed description in conjunction with the accompanying drawings, in which:

FIG. 1 depicts a high level diagram of a system according to one embodiment of the invention.

DETAILED DESCRIPTION

Various embodiments are described within the context of Fiber Optic Service ("FiOS") technology; however, these embodiments and others may be readily adapted to other data and/or signal transmission technologies, such as, Digital Subscriber Line ("DSL"), cable television networks, and the like.

FIG. 1 depicts a high level diagram of a system according to one embodiment. Specifically, the system 100 of FIG. 1 comprises an access network 110, a network interface device ("NID") 120, a premises gateway or residential gateway device ("GD") 130, one or more data devices 140, and a battery back-up and power unit 150.

The access network 110 comprises any access network suitable for conveying data, television signals, and more generally, communication signals to the NID 120. The physical layer of the access network 110 may be optical, electrical, hybrid fiber-coax, wireless, and the like. Regardless of the access network topology, the NID 120 operates to receive, translate, and transmit data between the access network 110 and the GD 130. That is, the NID 120 may be selected to process optical (e.g., FiOS), DSL, cable, and/or other access network data types to communicate thereby with a local data type, such as Ethernet, 802.11, and the like.

The NID 120 comprises a signal processing unit 122 and a power processing unit 124. The signal processing unit 122 processes data passed between the access network 110 and GD 130. In the case of optically transported data, the signal processing unit 122 comprises a standard electrical and optical transmission and reception circuitry adapted to receive and convert optical data signals to electrical data signals and vice versa. In general, the signal processing unit 122 operates to translate data and other signals between the format appropriate for the access network 110 and the format appropriate for the GD 130.

The power processing unit 124 provides power appropriate to the signal processing unit 122. The power processing unit 124 receives power to be processed via a cabling between the NID 120 and the GD 130. In one embodiment the cabling CABLE comprises an RG-6 coaxial cable carrying one or more of Quadrature amplitude modulation ("QAM") data, Multimedia over Coax Alliance ("MoCA") data, Home Phoneline Networking Alliance ("HPNA") data, analog TV signals, analog phone signals, and the like.

In another embodiment, the power processing unit 124 receives power to be processed via power over Ethernet connection between the NID 120 and the GD 130. In the essence, a single data communication cable/Ethernet connector is used to convey both power and signals from the GD 130 to the NID 120, as well signals from the NID 120 to the GD 130. This communications cable/data cable may be single or multi-strand electrical wire. In one embodiment, the NID 120 includes a power extraction unit 126 that extracts power signals from the cabling between the NID 120 and the GD 130 and provides the extracted power signal(s) to the power processing unit 124. In yet another embodiment, the cabling includes separate wires for carrying data signals and power signals.

As those skilled in the art will appreciate, standard filtering circuitry, buffering circuitry and other signal processing circuitry has been omitted from FIG. 1 for clarity. Such circuitry is adapted to ensure that optical and electrical data signals and electrical power signals are properly conveyed and/or transformed, and that effects of noise, jitter, and other unwanted signal components are minimized while desired signal components are enhanced.

The GD 130 includes a signal processing unit 132 and a power processing unit 134. The power processing unit 134 receives power from the battery back-up and power unit 150 and provides power to the signal processing unit 132. The GD 130 is depicted as including the battery backup and power unit 150. However, the battery backup and power unit 150 may, for example, be a separate unit collocated or within the reasonable distance of the GD 130.

The signal processing unit 132 operates in a standard manner to propagate data between the NID 120 and data devices 140. The signal processing unit 132 processes signals received from the NID 120 and provides the processed signals in appropriate format to the data devices 140, such as one or more television systems $140_1$, one or more computer systems $140_2$, one or more telephones $140_3$, and other data devices $140_4$, such as a security system. Similarly, the data devices 140 may provide return data to the signal processing unit 132 for subsequent propagation to the access network 110 via the NID 120.

The power processing device 134 provides power to the signal processing unit 132. In addition, the power processing device 134 provides an output signal P-out which is coupled to the cabling CABLE between the GD 130 and the NID 120. In one embodiment, a power injection device 136 located within or outside of the GD 130 injects the output signal P-out into a signal path within the cabling between the GD 130 and the NID 120. P-out preferentially comprises a relatively low voltage direct current (DC) signal (e.g., 12V or 24V) which may be conveyed to the NID 120 along with other data signals. The P-out signal is extracted by the power extraction unit 126 and processed by power processor 124 to provide appropriate power to the NID 120 circuitry. Alternatively, the P-out signal may be provided directly from the battery back-up and power unit 150 and merely passing through the GD 130 to the cabling CABLE.

It should be noted that while in FIG. 1 the power extraction unit 126 and power injection unit 136 are depicted as being part of the NID 120 and GD 130 respectively, both the power extraction unit 126 and the power injection unit 136 may be independent devices. Also, they may be part of power processing units 124 and 134 or signal processing units 122 and 132 respectively. Furthermore, more than one power extraction unit 126 or power injection unit 136 could be employed within the system 100.

It should be further noted that both power extraction unit 126 and power injection unit 136 may be omitted from the system 100. For example, if separate wires are used to transmit signals and power, then a separate wire transmitting power could be used to connect the power processing units 124 directly to power processing unit 134 or to the battery back-up and power unit 150.

The battery back-up and power unit 150 provides the initial power used by the power processing unit 134. The battery back-up and power unit 150 normally converts power from an AC source, such as a standard household electrical outlet, to a power signal P-in suitable for use by the power processing unit 134. However, in the event of a power failure, battery power is processed by power conversion circuitry (such as, voltage inverters, filters, an so on (not shown)) to ensure that the power signal P-in is still generated by the battery back-up and power unit 150.

One embodiment operates to convey power to the external NID 120 using the same cabling as for signal propagation. In this matter, the power necessary to operate the NID 120 is always available, irrespective of the type of access network utilized. That is, if a non-electrical access network is used (i.e., an optical network) where the power cannot be received from the access network 110, the NID 120 is powered by the GD 130.

Additionally, the output power signal P-out may be coupled to the cabling between the GD 130 and one or more data devices 140 (e.g., a telephone $140_3$). Such output signal P-out can be provided continuously and/or only in the case of the power failure. In this manner, the phone service is provided even when power is lost.

The GD 130 optionally monitors the status of the battery back-up and power unit 150. The battery back-up and power unit 150 includes in one embodiment a status processing unit 152 which monitors the status of a battery 154, such as whether the battery 154 is hot, fully charged, weak, needs replacement, and so on. The status processing unit 152 detects a status of battery 154 and transmits an appropriate signal to the signal processing unit 132. In one embodiment, the signal processing unit 132 processes the signal from the status processing unit 152 and provides the processed signal to the NID 120 for the subsequent transmission to the access network 110.

In another embodiment, the signal processing unit 132 processes the signal from the status processing unit 152 and provides the processed signal to one of the data devices 140. In yet another embodiment, the signal processing unit 132 processes the signal from the status processing unit 152 and provides the processed signal to a battery indicator 138, which is included in the GD 130. In response, the battery indicator 138 displays the battery status corresponding to the processed signal.

In FIG. 1 the GD 130 and a battery back-up and power unit 150 are located internal to a customer's premises (inside), while the network interface device is located external to the customer's premises (outside). However, in another embodiment, the NID 120 is also located internal to the customer premises. Further, the NID 120 and GD 130 may be collocated or combined into a single device.

The above described embodiments may be implemented within the context of methods, computer readable media, and computer program processes. As such, it is contemplated that some of the steps discussed herein as methods, algorithms, and/or software processes may be implemented within hardware (e.g., circuitry that cooperates with a processor to perform various steps), software or a combination of hardware and software.

One embodiment may be implemented as a computer program product wherein computer instructions, when processed by a computer, adapt the operation of the computer such that the methods and/or techniques described herein are invoked or otherwise provided. Instructions for invoking the methods may be stored in fixed or removable media, transmitted via a data stream in a signal bearing medium such as a broadcast medium, and/or stored within a working memory or mass storage device associated with a computing device operating according to the instructions.

Generally speaking, a computing device including a processor, memory, and input/output means may be used to process software instructions, store software instructions, and/or propagate software instructions to or from a communications channel, storage device, or other computer/system. It is noted that the various processing (power and signal) elements described herein may be implemented in this manner.

Although various embodiments have been shown and described in detail herein, those skilled in the art can readily devise many other varied embodiments that still incorporate the described teachings.

What is claimed is:

1. An apparatus, comprising:
  a gateway device for communicating with an access network via a network interface device (NID), for receiving power initially provided by a battery back-up and a power processing unit, and for providing power to the NID, the gateway device being adapted to provide power to operate the NID when communicating with a non-electrical access network, the gateway device further adapted to supply power to support at least one data device communicating with the access network via the gateway device, to detect a status of the battery back-up and the power processing unit, and to transmit at least one data signal reflecting the detected status via the gateway device to the NID for subsequent transmission to the non-electrical access network;

a power injection unit configured to receive power signal from the gateway device and inject the received power signal into a data communication cable between the gateway device and the NID; and a power extraction unit configured to extract the injected power signal from the data communication cable and to provide the extracted power signal to the NID.

2. The apparatus of claim 1, wherein the gateway device and the power processing unit are collocated.

3. The apparatus of claim 1, wherein the power processing unit is a part of the gateway device.

4. The apparatus of claim 1, wherein the gateway device monitors the status of the power processing unit.

5. The apparatus of claim 1, wherein the gateway device provides power to the at least one data device in communication with the access network via the gateway device.

6. The apparatus of claim 5, wherein the at least one data device is a telephone.

7. The apparatus of claim 1, wherein the NID communicates with the gateway device via a coaxial cable.

8. The apparatus of claim 1, wherein the gateway device receives power initially provided by a battery of the battery back-up and the power processing unit and provides the power to the NID.

9. The apparatus of claim 1, wherein the NID is mounted external to a structure and the gateway device is mounted internal to the structure.

10. A method for providing power to a network interface device (NID), comprising:

receiving power at a gateway device initially provided by a battery back-up and a power processing unit;

detecting a status of the battery back-up and the power processing unit;

transmitting at least one data signal reflecting the detected status via the gateway device to the NID for subsequent transmission to a non-electrical access network;

injecting power signal received from the gateway device into a data communication cable;

extracting the injected power signal from the data communication cable to thereby provide power to the NID; and providing power from the gateway device to the NID via the data communication cable, the gateway device being adapted to provide power to operate the NID when communicating with the non-electrical access network, the gateway device further adapted to supply power to support at least one data device communicating with the access network via the gateway device.

11. The method of claim 10, further comprising:

monitoring status of the battery back-up and power processing unit via the gateway device.

12. The method of claim 10, wherein the gateway device includes a status indicator unit for indicating the status of the battery back-up and power processing unit.

13. A method, comprising:

supplying power to a network interface device (NID) through a data communication cable connecting the NID and a gateway device in response to a power failure, the gateway device being in communication with an access network via the NID;

wherein a power processing unit provides the supplied power for delivery to the NID via the gateway device, the gateway device being adapted to provide power to operate the NID when communicating with a non-electrical access network, the gateway device further adapted to supply power to support at least one data device communicating with the access network via the gateway device;

detecting a status of a battery back-up and the power processing unit via the gateway device; and transmitting at least one data signal reflecting the detected status via the gateway device to the NID for subsequent transmission to the non-electrical access network.

* * * * *